(12) United States Patent
Bethea et al.

(10) Patent No.: US 7,000,863 B2
(45) Date of Patent: Feb. 21, 2006

(54) METHOD AND APPARATUS FOR OPERATIONAL LOW-STRESS OPTICAL FIBER STORAGE

(75) Inventors: Clyde George Bethea, Franklin Park, NJ (US); John Philip Franey, Bridgewater, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 87 days.

(21) Appl. No.: 10/674,207

(22) Filed: Sep. 29, 2003

(65) Prior Publication Data

US 2005/0067522 A1 Mar. 31, 2005

(51) Int. Cl.
*G02B 6/00* (2006.01)
(52) U.S. Cl. ............................... 242/388.1; 242/388.6; 385/135; 385/137
(58) Field of Classification Search ............ 242/388.1, 242/388.6; 385/135, 136, 137
See application file for complete search history.

(56) References Cited

U.S. PATENT DOCUMENTS

| | | | | |
|---|---|---|---|---|
| 4,792,203 A * | 12/1988 | Nelson et al. | ............... | 385/135 |
| 4,911,521 A * | 3/1990 | Ryuto et al. | ................. | 385/135 |
| 6,349,893 B1 * | 2/2002 | Daoud | ......................... | 242/376 |
| 6,424,783 B1 * | 7/2002 | Hara | .......................... | 385/135 |
| 6,511,009 B1 * | 1/2003 | Harrison et al. | .......... | 242/388.1 |
| 6,535,684 B1 * | 3/2003 | Kondo et al. | ................ | 385/137 |
| 6,580,866 B1 * | 6/2003 | Daoud et al. | ............... | 385/135 |
| 6,612,515 B1 * | 9/2003 | Tinucci et al. | ............ | 242/388.1 |
| 6,810,192 B1 * | 10/2004 | Aude et al. | .................. | 385/135 |
| 2002/0126978 A1 * | 9/2002 | Holman et al. | .............. | 385/135 |

* cited by examiner

*Primary Examiner*—John Q. Nguyen

(57) ABSTRACT

A reel for storing optical fiber is disclosed that significantly reduces the torsional force applied to optical fiber as the fiber is being wound onto the reel for storage. The optical fiber reel comprises two spindles that are offset with respect to the rotational center of the reel. Such an arrangement causes the fiber to be wound onto the reel in a substantially linear fashion, thus preventing the torsional force and resulting twisting that cause micro-cracks to develop. The spindles are of a sufficiently large diameter to facilitate operational use of the fiber while stored on the spindle without increasing the attenuation of signals that could result from the use of a smaller diameter spindle.

2 Claims, 7 Drawing Sheets

METHOD AND APPARATUS FOR OPERATIONAL LOW-STRESS OPTICAL FIBER STORAGE

FIELD OF THE INVENTION

The present invention relates generally to optical fiber and, more particularly, to the storage of optical fiber.

BACKGROUND OF THE INVENTION

The use of optical fiber has become widespread in telecommunications applications. Light signals passed along such fiber are capable of extremely high data throughput rates, especially when coupled with throughput optimizing technologies such as dense wavelength division multiplexing (DWDM). Higher throughput over an optical fiber, as is used in long-distance optical transmissions, typically requires a signal with higher power and, accordingly, the fiber must be designed to increasingly stringent design tolerances to accommodate that higher power.

In telecommunications facilities, such as switching facilities, it is often necessary to connect multiple components with lengths of optical fiber. Traditionally, it has been desirable to use the minimum length of fiber necessary to connect the components to avoid clutter in the facilities. As a result, a typical method of connecting two components has been to measure the length of optical fiber necessary to connect two components and use a length of fiber having connectors on each end to connect to the respective components. If the components were then moved with respect to each other, reconnecting them was simply a matter of obtaining a longer length of fiber and attaching connectors to that new fiber.

However, while using such connectors with optical fibers is sufficient in relatively low-power optical applications, it becomes less desirable as the power of the optical signal passed across the fiber increases, such as the case in long-haul optical transmission applications. This is because optical fiber carrying relatively high power signals tends to fail more readily at the connector due to, for example, signal leakage and heat build-up at the connector. Therefore, in more recent attempts at connecting two or more optical components, multiple lengths of fiber were spliced together to avoid the need for connectors. Splicing for high-power applications requires very stringent alignment of the fibers to prevent discontinuities in the spliced fiber. Thus, the splicing operation was often a time consuming effort. Therefore, in order to eliminate the need for re-splicing the fiber in the event the components were moved relative to one another, a long length of fiber was used. The resulting spliced length of optical fiber between the two components typically significantly exceeded the minimum length necessary to connect those components. In order to prevent clutter due to the excess fiber, spools were used to store the excess fiber. Thus, for example, if the components were relocated subsequent to being connected, additional fiber was available to bridge any increased separation distance between the components.

FIGS. 1A and 1B show, respectively, a three dimensional view and a top view of an illustrative prior spool 101 used for storing such excess fiber. In those figures, fiber 102 was wound around a central spindle 103 that was supported by side members 106. One end of optical fiber 102 extended in direction 105 and was connected to a first optical component and a second end of optical fiber 102 extended in direction 104 and was connected to, illustratively, a second optical component. When additional fiber was needed, e.g., to bridge the aforementioned increased separation distance due to moving the components, the fiber could simply be unwound from the spool. Thus, the costs associated with repeated splicing of fiber in relatively high power applications were avoided.

SUMMARY OF THE INVENTION

While prior attempts at storing excess fiber between optical components, such as the aforementioned spools, were advantageous in many applications, they were limited in certain regards. For example, although prior storage spools prevented clutter and eliminated the need for multiple splicing operations in the case where components were moved, the present inventors have recognized that storing fiber on such spools introduced a torsional force to the fiber. This force tended to cause the fiber to twist as it was being wound onto the spools. Over time, the stress resulting from this torsional force/twisting caused small cracks, known as micro-cracks, to develop in the optical fiber. Such micro-cracks tend to increase attenuation of an optical signal when a relatively low power is passed over fiber with such cracks. However, the problem is much more significant when high-power signals are transmitted over fiber such that, when micro-cracks are present in the fiber, the fiber may actually heat at the location(s) of the micro-cracks to the point of melting.

Therefore, the present inventors have invented a reel for storing optical fiber that significantly reduces the torsional force applied to the fiber as it is being wound onto the reel for storage. Specifically, the present inventors have invented an optical fiber reel that utilizes two spindles that are offset with respect to the rotational center of the reel. Such an arrangement causes the fiber to be wound onto the reel in a substantially linear fashion, thus preventing the torsional force and resulting twisting that cause micro-cracks to develop. Additionally, the spindles are of a sufficiently large diameter to facilitate operational use of the fiber while stored on the spindle without increasing the attenuation of signals that could result from the use of a smaller diameter spindle.

DETAILED DESCRIPTION

Figure 1A:
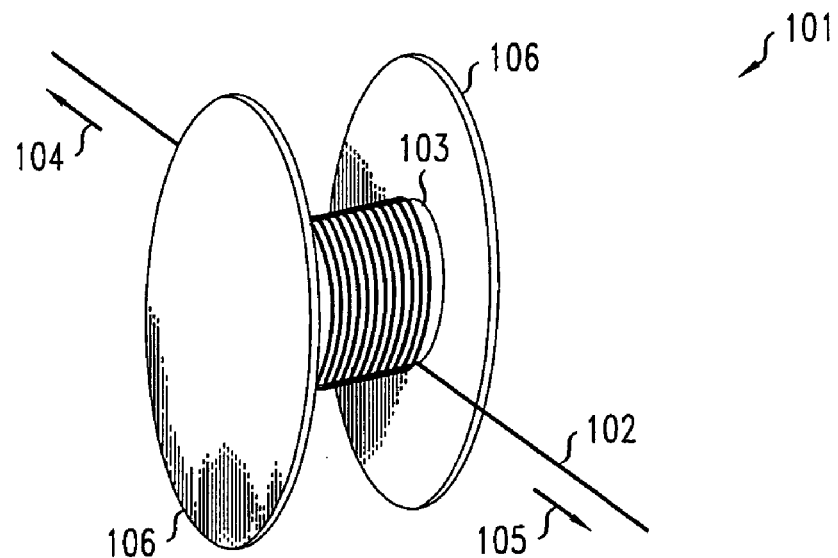
FIGS. 1A and 1B shows, respectively, a three dimensional view and a top view of an illustrative prior art spool used to store optical fiber in a telecommunications facility.
Figure 1B:
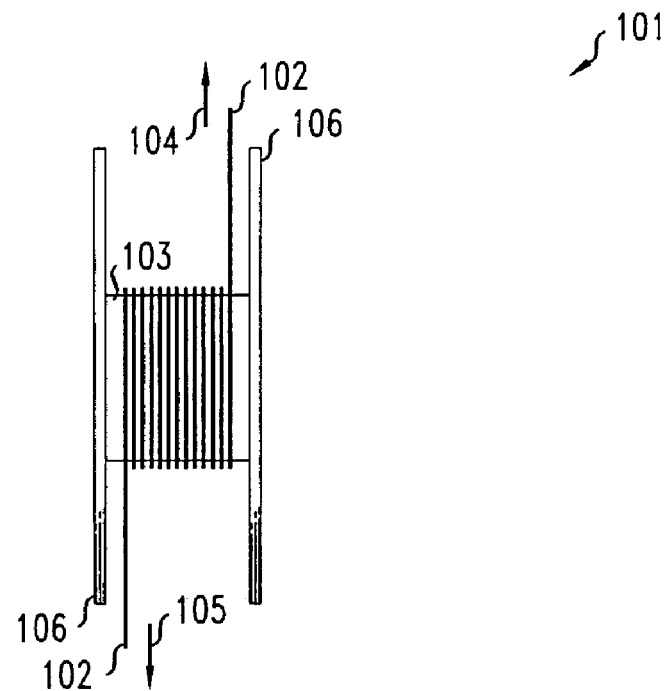
Figure 2A:
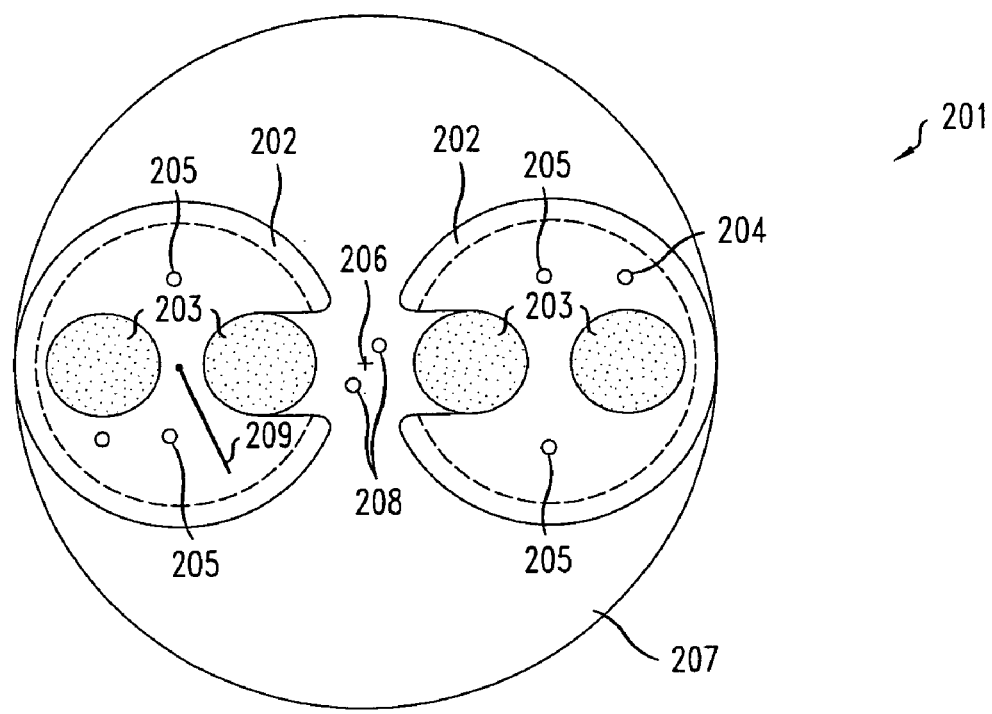
FIGS. 2A and 2B show a top view and a side view, respectively, of an optical fiber reel in accordance with the principles of the present invention.
Figure 2B:
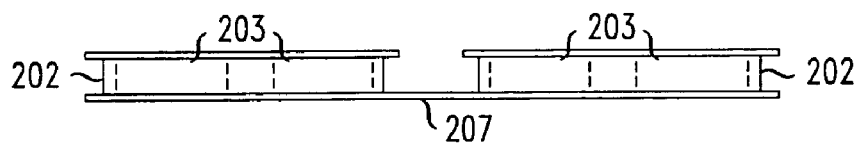

FIGS. 2A and 2B show a top and a side view, respectively, of an optical fiber reel 201 in accordance with the principles of the present invention. As compared to prior fiber spools, such as that illustrated in FIGS. 1A and 1B, the illustrative reel of FIGS. 2A and 2B is characterized by a support member 207 upon which two optical fiber spindles 202 are mounted. Reel 201 is illustratively manufactured from an aluminum or plastic material, although other materials would be equally advantageous. Spindles 202 have a radius that is sufficient to prevent excessive bending of the optical fiber, exemplarily a radius of ½ of an inch, so that, at relatively high signal powers (e.g., 1 Watt), the signal transmitted over the fiber will not be significantly attenuated. For illustrative purposes, support member 207 is herein shown as a circular disk. One skilled in the art will recognize that many different disk materials, shapes and configurations will be equally advantageous. Illustratively, the two spindles 202 are offset from the rotational center 206 of the reel. As described further below, spindles 202 are useful for storing optical fiber that is operational, i.e., that is in operational use for the transmission of optical signals. One skilled in the art will also recognize that, while two spindles are illustrated in the figures herein, three or more spindles may be used equally advantageously in accordance with the principles of the present invention. The fiber reel of FIGS. 2A and 2B has, illustratively, holes 208 that are adapted to hold a clip that may be used to hold down a portion of the optical fiber, such as for example a region of spliced fiber, to facilitate the winding of the fiber onto the reel 201. Holes 203 may be used, for example, as finger holes to facilitate manual winding of the fiber onto the reel. Holes 205 are, illustratively, holes adapted to receive screws for mounting spindles 202 onto disk 207. Finally, holes 204 described further herein below, are adapted to receive screws that may be used to hold reel 201 stationary relative to a holding apparatus once the fiber has been wound onto reel 201.

Figure 3:
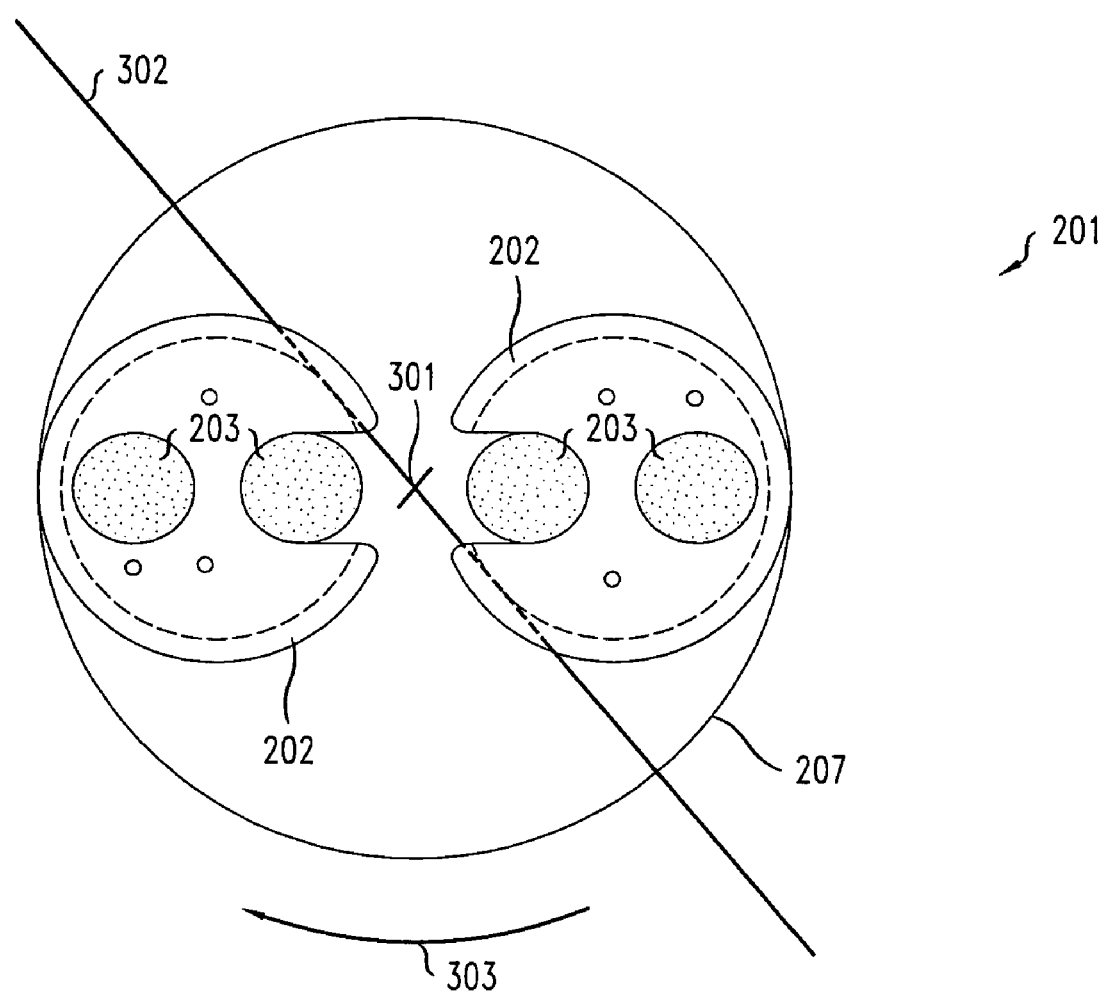
FIG. 3 shows the optical fiber reel of FIG. 2A wherein a fiber is secured to the reel.

FIG. 3 shows reel 201 of FIG. 2A holding a length of fiber 302 that is, illustratively, a fiber connecting two optical components. Fiber 302 is clipped to disk 201 illustratively, by clip 301 that is adapted to be secured to disk 201 via holes 208 in FIG. 2. The portion of fiber 302 under clip 301 is, for example, that point on the fiber that is half the distance along that fiber from illustrative optical components connected to both ends of fiber 302 and may be, illustratively, that portion of fiber where two fibers are spliced together. Thus situated, the secured portion of the fiber will be held securely by clip 301 thus minimizing any stress experienced by that portion of fiber. To begin winding the fiber onto reel 201 holes 203 can illustratively be used to manually rotate disk 207 in direction 303, thus causing the fiber to be wound around spindles 202. One skilled in the art will recognize that many methods of winding fiber onto the reels will be equally advantageous such as, for example, other manual or mechanical means.

Figure 4A:
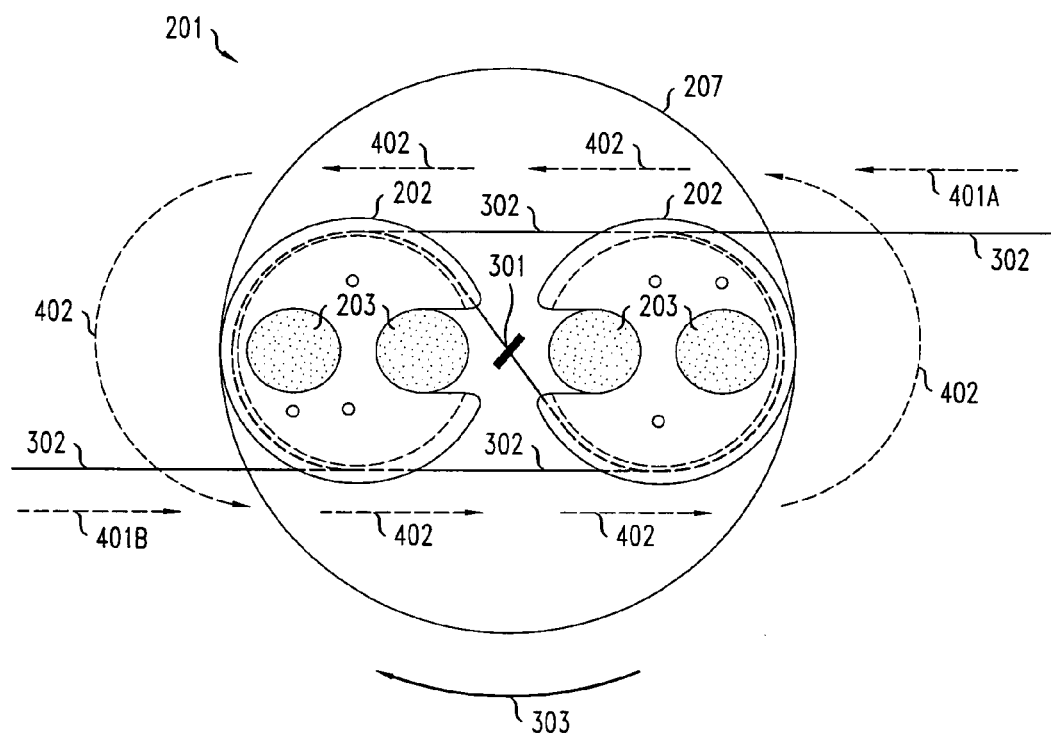
FIGS. 4A and 4B show a top view and a side view, respectively, of how fiber is wound onto the optical fiber reel of FIGS. 2A and 2B.
Figure 4B:
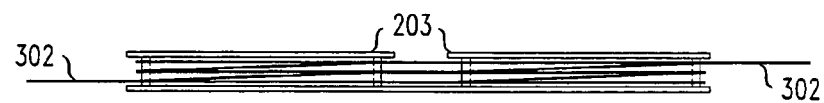

FIGS. 4A and 4B show the illustrative fiber reel 201 of FIGs. 2A and 2B wherein fiber is wound around the spindles 202 on disk 207. As described above, holes 203 are illustratively used to rotate disk 207 in direction 303. Thus, for example, fiber 302 enters the reel 201 from directions 401A and 401B from two separate optical components. As reel 201 is turned in direction 303, the fiber is wrapped around spindles 202 in direction 402 until a desired amount of the excess fiber is wound around spindles 202. This manner of winding fiber onto reel 201, with the fiber secured under clip 301 and wound around spindles 202, ensures that the fiber 302 is linearly wound around the spindles 202 such that substantially no torsional force is applied to the fiber as it is wound. Thus, unlike with prior fiber spools, the fiber does not twist and, accordingly, no stress-induced micro-cracks occur during storage.

Figure 5A:
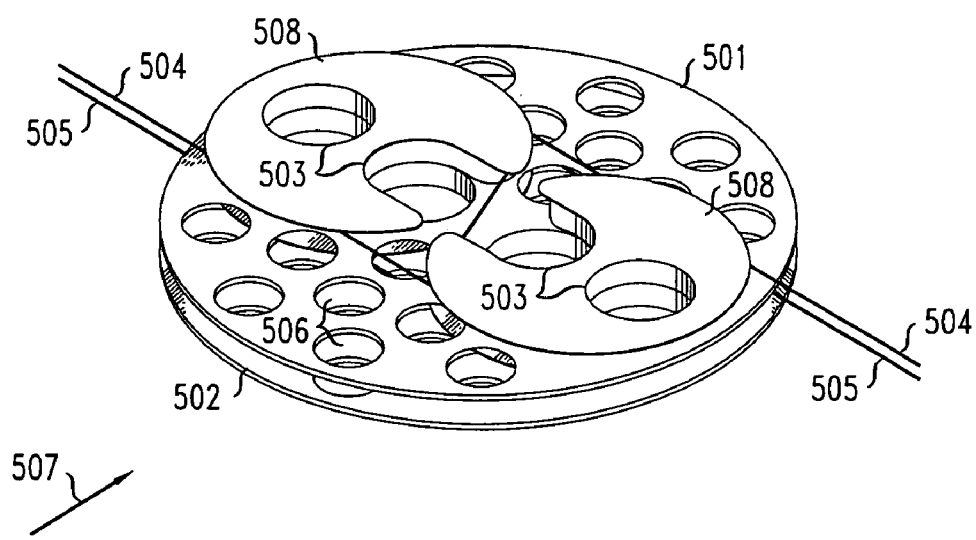
FIGS. 5A and 5B show a three dimensional view and a side view, respectively, of how two or more fiber reels in accordance with the principles of the present invention can be used together.
Figure 5B:
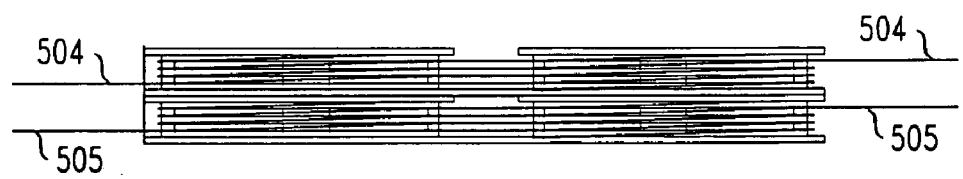

FIG. 5A shows a three-dimensional view of two fiber reels 501 and 502 of the type illustrated in FIGS. 4A and 4B. FIG. 5B shows the two fiber reels of FIG. 5A as viewed from direction 507. Collectively, FIGS. 5A and 5B show illustrative reels 501 and 502 that are configured to be placed on top of one another to facilitate more compact storage of the reels once the fibers 504 and 505 are wound onto the spindles 508. Illustrative holes 506, as well as finger holes 508, allow air to pass through reels 501 and 502.

Figure 6A:
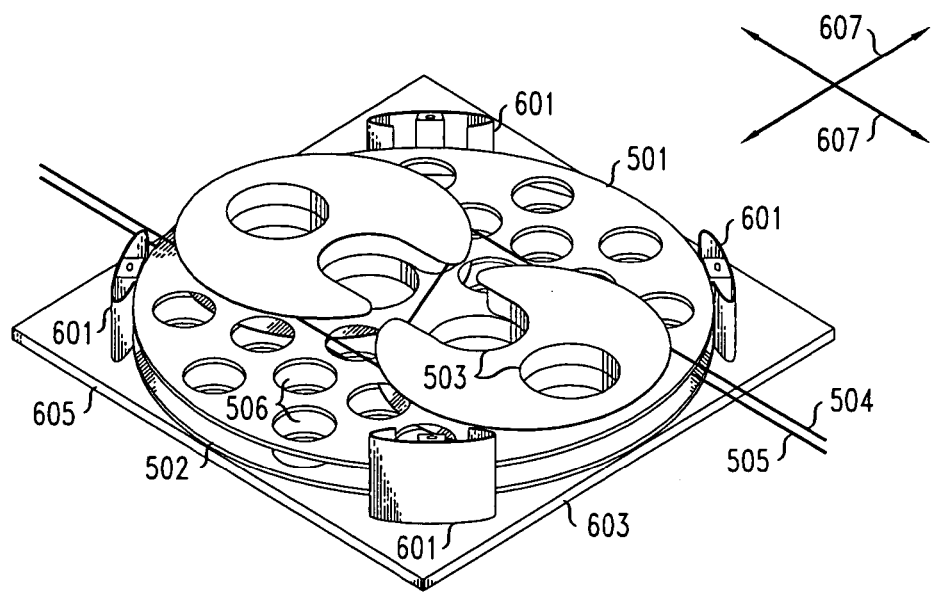
FIGS. 6A and 6B show a three-dimensional view of an illustrative holder for the fiber reels of FIGS. 5A and 5B.
Figure 6B:
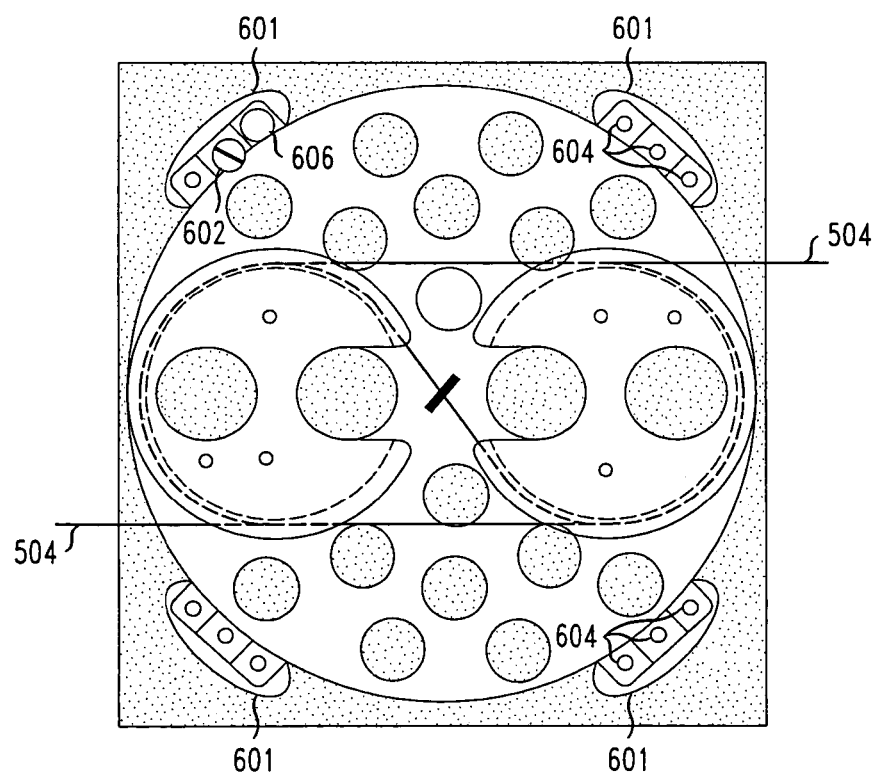

FIGS. 6A and 6B show a three-dimensional view and a top view of an illustrative holding member 603 used to store the reels of FIGS. 5A and 5B. Specifically, plate 605, which is illustratively manufactured of aluminum, has support members 601 spaced apart from their opposing members on plate 605 a distance slightly more than the diameter of reels 501 and 502. Thus situated, reels 501 and 502 will be laterally held in place by posts 601 and plate 605 (I.e., the reels will be limited in their movement in directions 607) while, at the same time, it will still be possible to rotate the reels to adjust the amount of fiber 504 and/or 505 stored on reels 501 and 502, respectively. Referring to FIG. 6B, illustrative holes 604 are disposed vertically in posts 601. These holes are, for example, adapted to hold screws such that the upper portion (e.g., the head) of the screw overlaps the reel 501 and secures that real in place, thereby preventing any rotation of the reels. Each of the holes 604 in each of the posts 601 is located at a height relative to the reels such that, upon inserting screws into each of the holes, a different reel will be secured. Thus, for example, screw 602 is located at a height such that it can secure reel 501. Similarly, screw 606 is located at a height such that it can secure reel 502. The third hole in the posts 601 is, illustratively, adapted to hold a screw for securing a third reel not shown in FIGS. 6A and 6B.

The present inventors have recognized that the illustrative holder of FIGS. 6A and 6B may serve other purposes other than acting as a holder for reels 501 and 502. For example, if holder 603 is manufactured from heat-conductive material (such as the aforementioned aluminum), the bottom of the holding member may be adapted to be attached to a heat-generating component, such as a computer processor. Thus attached, holding member 603 could also serve as a heat-dissipation device (i.e., a heat sink) for dissipating the heat generated by that component. In such a use, holes 506 and holes 503 become especially useful in allowing air to pass through the reels 501 and 502 in order to facilitate such heat dissipation.

Figure 7A:
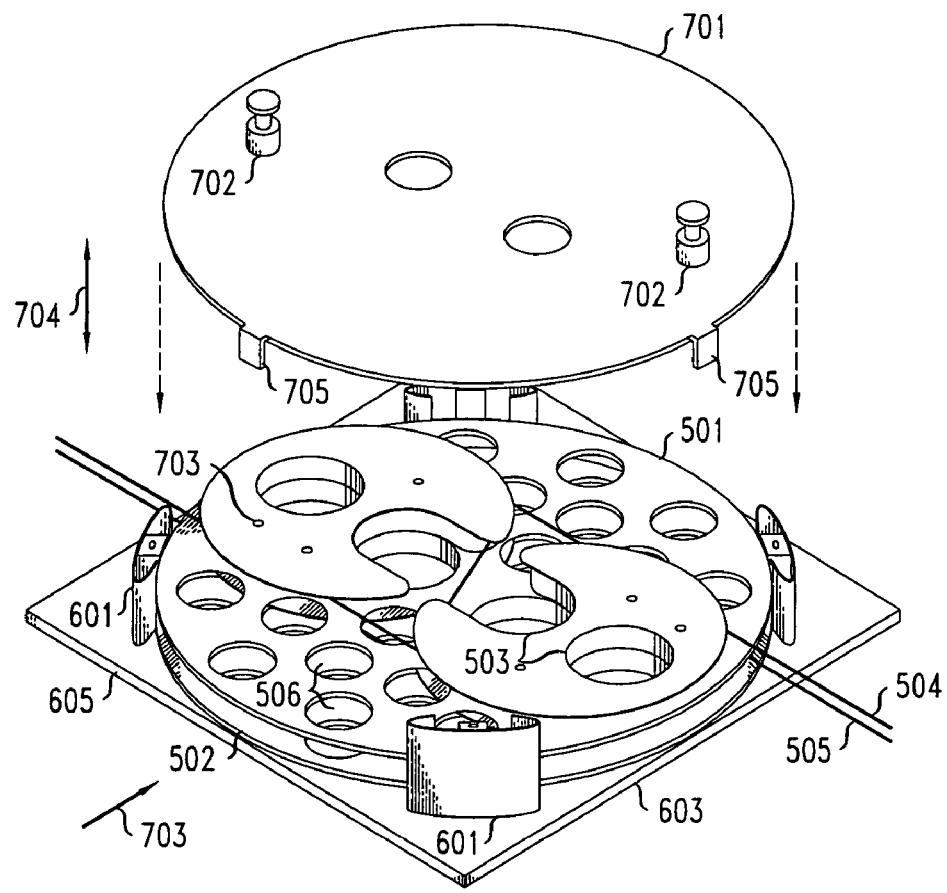
FIGS. 7A and 7B show a three-dimensional view and a side view of how a housing can be used to enclose the fiber reels of FIGS. 5A and 5B within the holder of FIGS. 6A and 6B.
Figure 7B:
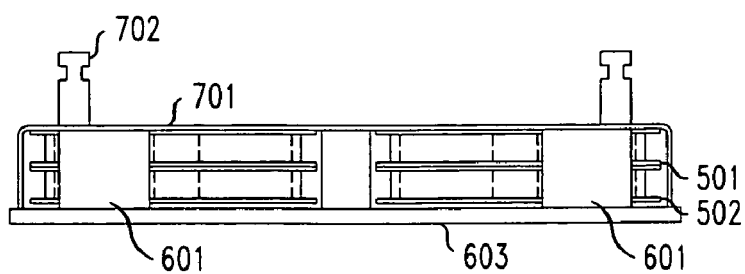

FIGS. 7A and 7B show an additional embodiment in accordance with the principles of the present invention. Specifically, FIGS. 7A and 7B show a three-dimensional view and a side view, respectively, of the fiber reels 501 and 502 and holding member 603 of FIGS. 6A and 6B wherein a cover plate 701 is used to remove a fiber reel after it has been placed in the holding member. It may be necessary to remove a fiber reel, for example, to gain access to underlying fiber reels. Also, in the case where the holding member 603 of FIGS. 6A and 6B acts as a heat sink for electronic components, it may be necessary to remove the fiber reels from the holding member in order to facilitate access to the underlying electronics components. In order to remove a fiber reel, screws 702 are illustratively screwed into holes 703 on reel 501 to attach cover plate 701 to that reel. Cover plate 701 can then be lifted away with fiber reel 501 attached, thus providing access to the reels or electronic components underneath reel 501. Flanges 705 fit closely to the support member 207 of reel 501, thus helping to secure the fiber 504 when reel 501 is lifted out of holding member 603.

The foregoing merely illustrates the principles of the invention. It will thus be appreciated that those skilled in the art will be able to devise various arrangements which, although not explicitly described or shown herein, embody the principles of the invention and are within its spirit and scope. For example, one skilled in the art, in light of the descriptions of the various embodiments herein, will recognize that the principles of the present invention may be utilized in widely disparate fields and applications. All examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. An apparatus for storing optical fiber comprising:
a support member;
at least a first spindle disposed on said support member, said spindle offset with respect to the rotational center of said support member;
a holding member, said holding member adapted to hold said support member and said spindle in a way such that said support member is constrained in at least a first direction of movement, said holding member comprises a plate having a plurality of posts adapted in a way such that said support member can lie horizontally between said posts;
means for holding said support members substantially stationary with respect to said holding member;
wherein the diameter of at least a portion of said at least a first spindle is sufficiently large to prevent attenuation of optical signals transmitted over optical fiber disposed around the circumference of said spindle; and
wherein said means for holding comprises a plurality of holes disposed in said posts and a plurality of screws adapted to be screwed into said holes.

2. The apparatus of claim 1 wherein said at least a first spindle comprises two spindles.

* * * * *